(12) United States Patent
Dudar

(10) Patent No.: US 11,022,010 B2
(45) Date of Patent: Jun. 1, 2021

(54) ENGINE VARIABLE OIL PUMP DIAGNOSTIC METHOD

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 15/853,107

(22) Filed: Dec. 22, 2017

(65) Prior Publication Data
US 2019/0195095 A1 Jun. 27, 2019

(51) Int. Cl.
| | |
|---|---|
| F01M 1/20 | (2006.01) |
| B60W 10/30 | (2006.01) |
| B60W 20/00 | (2016.01) |
| F01M 1/02 | (2006.01) |
| F01M 13/00 | (2006.01) |
| F02D 41/22 | (2006.01) |
| F02D 41/04 | (2006.01) |
| F02D 41/26 | (2006.01) |

(52) U.S. Cl.
CPC .............. *F01M 1/20* (2013.01); *B60W 10/30* (2013.01); *B60W 20/00* (2013.01); *F01M 1/02* (2013.01); *F01M 13/00* (2013.01); *F02D 41/221* (2013.01); *F01M 2001/0215* (2013.01); *F01M 2001/0246* (2013.01); *F01M 2013/0083* (2013.01); *F02D 41/042* (2013.01); *F02D 41/26* (2013.01); *Y10S 903/904* (2013.01)

(58) Field of Classification Search
CPC .................................................. F02D 31/003
See application file for complete search history.

(56) References Cited

U.S. PATENT DOCUMENTS

| | | | | | |
|---|---|---|---|---|---|
| 4,328,480 | A | * | 5/1982 | Keitel | ...... F01M 1/20 340/451 |
| 4,489,311 | A | * | 12/1984 | Lang | ...... B60R 16/0232 123/196 S |
| 4,693,081 | A | * | 9/1987 | Nakamura | ...... F16H 61/0025 417/220 |
| 4,774,918 | A | * | 10/1988 | Kurio | ...... F16N 13/04 123/196 R |
| 4,803,969 | A | * | 2/1989 | Hiereth | ...... F02B 37/14 123/561 |
| 5,078,233 | A | * | 1/1992 | Oetting | ...... F01M 1/12 123/196 R |
| 5,085,187 | A | * | 2/1992 | Black | ...... F01M 1/02 123/196 R |
| 5,195,474 | A | * | 3/1993 | Urata | ...... F01M 1/12 123/90.12 |

(Continued)

OTHER PUBLICATIONS

Dudar, A., "Engine Variable Oil Pump Diagnostic Method," U.S. Appl. No. 15/792,693, filed Oct. 24, 2017, 42 pages.

*Primary Examiner* — Bhavesh V Amin
(74) *Attorney, Agent, or Firm* — Geoffrey Brumbaugh McCoy Russell LLP

(57) ABSTRACT

Methods and systems are provided for diagnosing the functioning of a variable displacement oil pump. In one example, a method may include commanding a change in displacement of the variable displacement oil pump during a vehicle keyed-off condition and diagnosing a degradation of the oil pump based on a corresponding change in an estimated crankcase pressure.

17 Claims, 4 Drawing Sheets

(56) References Cited

U.S. PATENT DOCUMENTS

| | | | | |
|---|---|---|---|---|
| 5,339,776 A * | 8/1994 | Regueiro | | F01M 1/16 |
| | | | | 123/196 AB |
| 5,353,753 A * | 10/1994 | McGrath | | F01M 1/16 |
| | | | | 123/196 R |
| 5,355,851 A * | 10/1994 | Kamiya | | F01M 3/02 |
| | | | | 123/196 R |
| 5,390,635 A * | 2/1995 | Kidera | | F01M 3/02 |
| | | | | 123/196 R |
| 5,605,128 A * | 2/1997 | Nusser | | F02D 41/086 |
| | | | | 123/339.24 |
| 5,806,486 A * | 9/1998 | Gee | | F02D 41/08 |
| | | | | 123/339.22 |
| 5,826,556 A * | 10/1998 | Ruman | | F01M 1/16 |
| | | | | 123/196 W |
| 5,921,758 A * | 7/1999 | Anamoto | | F01M 3/02 |
| | | | | 123/196 R |
| 6,131,539 A * | 10/2000 | Thomas | | F01M 1/22 |
| | | | | 123/196 S |
| 6,216,651 B1 * | 4/2001 | Ishikawa | | F01M 3/02 |
| | | | | 123/196 AB |
| 6,488,479 B1 * | 12/2002 | Berger | | F01M 1/16 |
| | | | | 123/196 R |
| 6,647,965 B1 * | 11/2003 | Breeden | | F01L 9/10 |
| | | | | 123/446 |
| 7,021,281 B2 * | 4/2006 | Ruiz | | F02D 31/003 |
| | | | | 123/339.11 |
| 7,314,425 B2 * | 1/2008 | Ito | | B60W 20/00 |
| | | | | 477/5 |
| 7,665,352 B2 * | 2/2010 | Staley | | G01M 3/32 |
| | | | | 73/114.57 |
| 7,666,115 B2 * | 2/2010 | Ito | | B60K 6/445 |
| | | | | 477/5 |
| 7,674,095 B2 * | 3/2010 | Hunter | | F04C 2/102 |
| | | | | 417/220 |
| 7,726,948 B2 | 6/2010 | Hunter et al. | | |
| 8,499,738 B2 * | 8/2013 | Storch | | F01M 1/02 |
| | | | | 123/196 R |
| 8,734,122 B2 * | 5/2014 | Murray | | F01M 1/20 |
| | | | | 417/212 |
| 8,739,746 B2 * | 6/2014 | Bidner | | F01M 11/10 |
| | | | | 123/41.15 |
| 8,911,217 B2 * | 12/2014 | Takahashi | | F01M 1/20 |
| | | | | 417/281 |
| 9,239,306 B2 * | 1/2016 | Okamoto | | G01N 27/00 |
| 9,447,745 B2 | 9/2016 | Worden et al. | | |
| 9,458,811 B2 * | 10/2016 | Wang | | B60W 10/02 |
| 2001/0049574 A1 * | 12/2001 | Taniguchi | | F16H 61/66259 |
| | | | | 701/51 |
| 2002/0083915 A1 * | 7/2002 | Choi | | F01M 1/16 |
| | | | | 123/196 AB |
| 2004/0187835 A1 * | 9/2004 | Hoff | | F01M 1/16 |
| | | | | 123/196 R |
| 2005/0169765 A1 * | 8/2005 | Ito | | B60W 20/00 |
| | | | | 417/10 |
| 2006/0011166 A1 * | 1/2006 | Ruiz | | F02D 31/003 |
| | | | | 123/339.1 |
| 2007/0119640 A1 * | 5/2007 | Ito | | B60W 20/00 |
| | | | | 180/65.27 |
| 2008/0240941 A1 * | 10/2008 | Kumazaki | | F16H 61/0031 |
| | | | | 417/309 |
| 2010/0147256 A1 * | 6/2010 | Takahashi | | F01M 1/20 |
| | | | | 123/196 S |
| 2011/0066357 A1 * | 3/2011 | Rollinger | | F01L 1/34 |
| | | | | 701/105 |
| 2011/0071740 A1 * | 3/2011 | Nihei | | F16D 48/066 |
| | | | | 701/54 |
| 2011/0209682 A1 * | 9/2011 | Storch | | F01M 1/02 |
| | | | | 123/196 R |
| 2011/0224883 A1 * | 9/2011 | Bruno | | F01M 1/08 |
| | | | | 701/102 |
| 2012/0063927 A1 * | 3/2012 | Murray | | F01M 1/20 |
| | | | | 417/279 |
| 2012/0103709 A1 * | 5/2012 | Mochiyama | | F16H 61/0031 |
| | | | | 180/65.21 |
| 2013/0164162 A1 * | 6/2013 | Saga | | F04C 2/344 |
| | | | | 418/24 |
| 2013/0192545 A1 * | 8/2013 | Bidner | | F01M 1/08 |
| | | | | 123/41.15 |
| 2013/0237147 A1 * | 9/2013 | Dearman | | H04L 67/18 |
| | | | | 455/41.1 |
| 2013/0238147 A1 * | 9/2013 | Okamoto | | F04B 51/00 |
| | | | | 700/282 |
| 2013/0282255 A1 * | 10/2013 | Pursifull | | F01M 11/12 |
| | | | | 701/102 |
| 2013/0340732 A1 * | 12/2013 | Pursifull | | F01M 13/023 |
| | | | | 123/572 |
| 2014/0069534 A1 * | 3/2014 | Cunningham | | F02M 35/10118 |
| | | | | 137/557 |
| 2014/0081549 A1 * | 3/2014 | Rollinger | | F02N 11/10 |
| | | | | 701/101 |
| 2015/0112523 A1 * | 4/2015 | Wang | | B60W 10/06 |
| | | | | 701/22 |
| 2019/0120096 A1 * | 4/2019 | Dudar | | F01M 1/18 |
| 2019/0195095 A1 * | 6/2019 | Dudar | | F01M 1/02 |
| 2019/0211769 A1 * | 7/2019 | Dudar | | F02D 41/1441 |
| 2019/0242310 A1 * | 8/2019 | Dudar | | F01M 13/0011 |

* cited by examiner

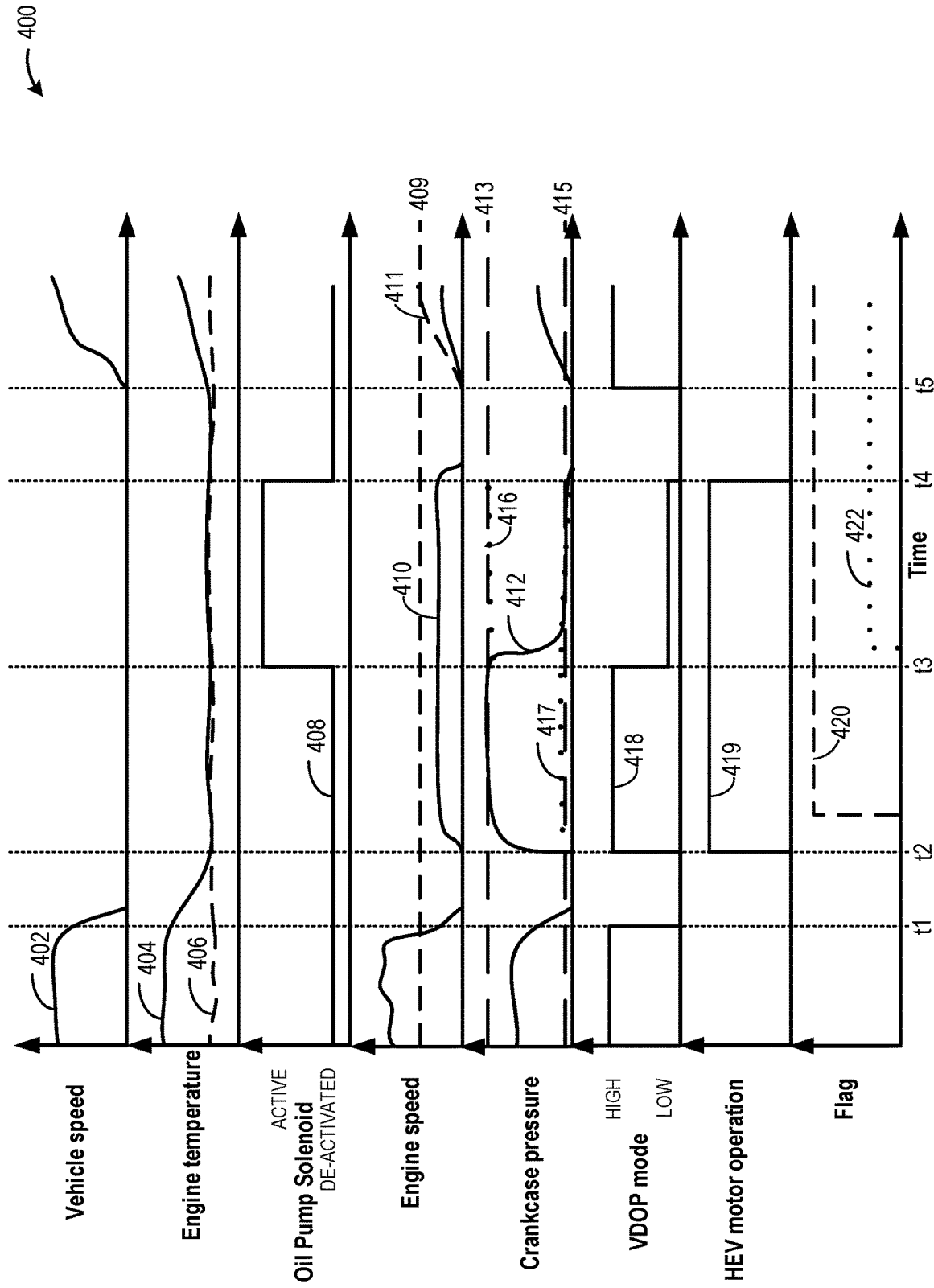

ENGINE VARIABLE OIL PUMP DIAGNOSTIC METHOD

FIELD

The present description relates generally to methods and systems for diagnosing the functioning of a variable displacement oil pump.

BACKGROUND/SUMMARY

An internal combustion engine typically includes a lubrication circuit comprising an oil pump. The oil pump is mechanically connected to and driven off of the engine crankshaft such that the output flow of the oil pump is directly linked to the crankshaft rotation speed. Traditionally, oil pumps have been fixed displacement pumps, typically having an oversized configuration to ensure a sufficient supply of oil at low speeds when the pump is turning slowly as well as at high speeds when the pump is turning faster. Thus, fixed displacement pumps displace a fixed oil volume for each turn of the crankshaft, thereby ensuring proper lubrication of moving engine parts at low and high engine speeds. However, given a range of engine speeds, the oil displacement may be higher than desirable by the engine, leading to inefficient use of engine power. For example, at high engine speeds, a high rate of oil pump rotation due to increased crankshaft rotation speed over-delivers oil supply. The excess oil is typically dealt with via a release valve that routes the excess oil to the engine sump. Ultimately, a pumping loss is incurred when the oil pump displaces more oil volume than required by the engine.

In order to minimize penalties from pumping losses and reduce fuel consumption, oil pumps in recent internal combustion engines may be variable displacement oil pumps (VDOP). VDOP configurations may include vane type pumps wherein solenoid control valves may control the length of the vanes to adjust oil displacement and in some examples oil pressure, reducing the parasitic load on the engine crankshaft during high engine speeds and ultimately saving fuel. Such VDOPs may alternate between a high displacement mode and a low displacement mode of operation to deliver a desired volume of oil, based on engine operating conditions such as engine speed and torque. For example, at high engine speeds, the solenoid control valve may be energized to operate the VDOP in the low displacement mode such that the VDOP does not provide excess oil, thereby minimizing pumping losses, reducing fuel consumption and increasing fuel economy. In comparison, at low engine speeds, the solenoid control valve may be de-energized to return the VDOP to the high displacement mode such that the VDOP displaces a larger oil volume to compensate for the slower oil pump speeds and thus deliver suitable oil volume for engine protection. However, in some instances the VDOP may not properly switch between displacement modes, but instead may be stuck in a given displacement, or in between displacements. If the VDOP is stuck in the low displacement mode, for example, insufficient oil may be delivered to the engine during low engine speed conditions, increasing engine wear and potentially causing engine degradation. For this reason, vehicles may be configured to execute diagnostics for detecting whether the variable displacement oil pump is displacing a suitable oil volume when commanded to a given displacement mode.

One example approach for diagnosing a VDOP operation is shown by Murray et al. in U.S. Pat. No. 8,734,122. Here, the switching of states of a variable flow oil pump may be determined based on differences in oil pressure sensed by an oil pressure sensor. The variable flow oil pump may switch from a low flow to a high flow state during changes in engine speed and load for example, and the ensuing changes in oil pressure may be measured by the oil pressure sensor. Based on a comparison of expected and observed pressure changes, the diagnostic oil pressure sensor may indicate when the variable flow oil pump does not switch states, as dictated by engine needs.

However, the inventors herein have recognized potential issues with such systems. As one example, the engine oil pressure sensor used to diagnose the functioning of the variable displacement oil pump may malfunction, leading to false diagnosis of pump faults. Further, in the event of a malfunctioning oil pressure sensor being identified, there is a need for an alternative approach for diagnosing the functioning of the VDOP. As another example, during a drive cycle, there may not be sufficient duration of vehicle travel at high engine speeds as required for carrying out the oil pump diagnostics at low displacement. Therefore, the diagnostic routine may not be able to detect if the pump is stuck in a low displacement setting.

In one example, the issues described above may be addressed by an engine method comprising: indicating degradation of a variable displacement oil pump (VDOP) based on a change in estimated crankcase pressure, upon a commanded change in VDOP displacement. In this way, by monitoring a change in crankcase pressure with a commanded change in VDOP operation, a reliable diagnosis of the functioning of the VDOP may be carried out.

In one example, a diagnostic routine of the VDOP may be opportunistically carried out during vehicle key-off conditions when the engine is not operated and the engine temperature is substantially equal to the ambient temperature. Switching of the variable oil pump between high and low displacement modes may result in an expected and measurable change in crankcase pressure. During VDOP operation in the high displacement mode, a higher volume of oil may be displaced causing a higher volume of oil to vaporize relative to VDOP operation in the low displacement mode. Therefore, the expected crankcase pressure during the high displacement operation is higher than that during the low displacement operation. The variable oil pump may be commanded to switch oil displacement modes by actuation (e.g., energization/de-energization) of a solenoid of the oil pump. The diagnostic routine includes rotating the engine unfueled (e.g., via a motor) with the VDOP first actuated to a high displacement mode by maintaining the solenoid in a de-energized condition, and estimating a crankcase pressure corresponding to the high displacement mode setting via a crankcase pressure sensor. The measured crankcase pressure corresponding to the high displacement mode may be compared to a first baseline pressure. The VDOP may then be operated in the low displacement mode by energizing the solenoid and a crankcase pressure corresponding to the low displacement mode setting may be estimated via the crankcase pressure sensor. The crankcase pressure corresponding to the low displacement mode may be compared to a second baseline pressure. If it is determined that crankcase pressure corresponding to the high displacement mode is substantially equal to the first baseline pressure and that upon energizing of the solenoid, there is a drop in the crankcase pressure with the crankcase pressure corresponding to the low displacement mode being substantially equal to the second baseline pressure, it may be inferred that the VDOP is functioning as expected. However, if it is determined that the crankcase pressure corresponding to the high displacement mode is lower the first baseline pressure, it may be inferred that the VDOP is stuck in the low displacement mode. If the pump is diagnosed as being stuck in the low displacement mode, idle engine speed may be raised to mitigate engine wear. If it is determined that the crankcase pressure does not drop following the switch in pump displacement, it may be inferred that the VDOP is stuck in the high displacement mode.

In this way, by opportunistically using existing engine components, such as a crankcase pressure sensor, the need for additional sensors and/or equipment for diagnostics of a VDOP may be reduced. The technical effect of carrying out diagnostics of the VDOP during vehicle key-off conditions is that both displacement modes may be diagnosed without having to wait for a change in engine speed during on-road vehicle operation. By identifying the position at which the VDOP is stuck, suitable mitigating steps may be undertaken. Overall, by regularly monitoring the health of the VDOP, engine wear may be reduced, wasteful usage of lubricant may be reduced, and fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows an example diagnosis of a variable displacement oil pump based on crankcase pressure, according to the present disclosure.

DETAILED DESCRIPTION

Figure 1:
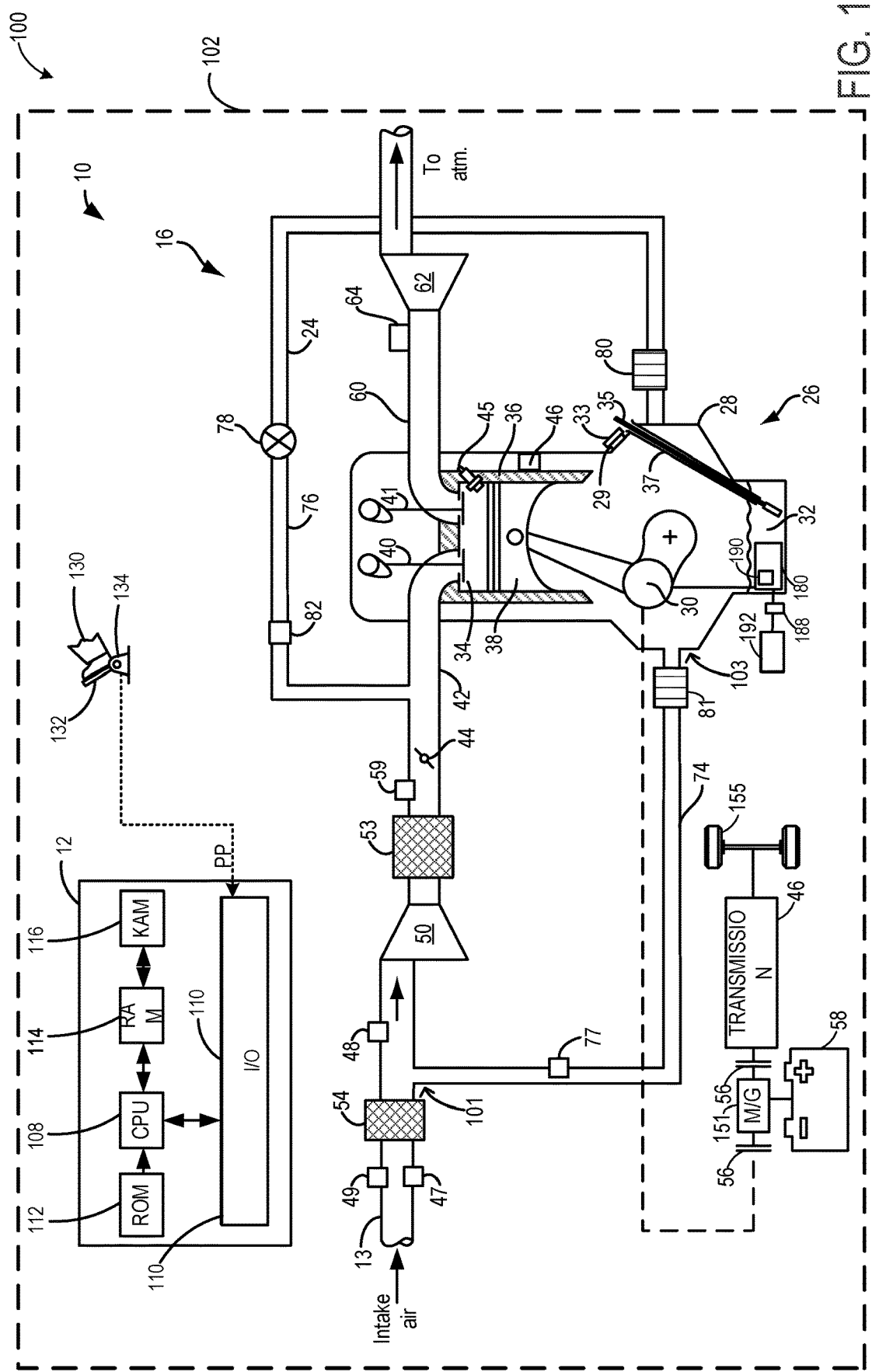
FIG. 1 schematically shows an example vehicle system with a variable displacement oil pump (VDOP).

The following description relates to systems and methods for diagnosing a variable displacement oil pump (VDOP), included in an example engine illustrated in FIG. 1. The VDOP may function to provide oil flow to the engine in accordance with a routine illustrated in FIG. 2, in a manner that is optimized for efficient engine operation, thereby improving vehicle fuel economy. An engine controller of the vehicle may be configured to perform an example routine to indicate degradation of the variable oil pump. In an example, a diagnostic routine illustrated in FIG. 3 may be performed. In order to diagnose the oil pump, the VDOP may be commanded to switch oil displacement modes via manipulation of a solenoid and the resulting changes in crankcase pressure may be indicative of pump condition. Example engine operations to enable VDOP diagnostics during a vehicle key-off condition are shown in FIG. 4.

FIG. 1 shows a schematic depiction 100 of a vehicle system 102. In some examples, vehicle system 102 may be a hybrid electric vehicle system. Vehicle system 102 includes an example system configuration of a multi-cylinder internal combustion engine, generally depicted at 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32.

A variable displacement oil pump (VDOP) 180 may be positioned in the oil well 32 to supply lubricating oil to different engine components. VDOP 180 may be coupled to crankshaft 30, the crankshaft 30 providing rotary power to operate the VDOP 180. In one example, the variable flow oil pump 180 includes a plurality of internal rotors and associated vanes (not shown) that are eccentrically mounted. At least one of the internal rotors may be coupled to a spring that is configured to be actuated by a solenoid 190 that is controlled by controller 12. When displaced by the solenoid, the spring may cause the internal rotors to pivot relative to one or more other rotors, resulting in variable length vanes, thereby adjusting an output flow rate and oil pressure from the VDOP 180. The VDOP 180 may selectively provide oil to an engine oil gallery 192 which supplies oil to various regions and/or components of engine 10 to provide cooling and lubrication. The output flow rate or oil pressure of the variable flow oil pump 180 may be adjusted by the controller 12 to accommodate varying operating conditions to provide varying levels of cooling and/or lubrication. In one example, oil pressure may be estimated via pressure sensor 188 positioned downstream of the output of the VDOP 180. Further, the oil pressure output from the VDOP 180 may be adjusted to reduce oil consumption and/or reduce energy consumption by the VDOP 180.

It will be appreciated that a suitable variable flow oil pump configuration may be implemented to vary the oil pressure and/or oil flow rate. In some embodiments, instead of being coupled to the crankshaft 30, the VDOP 180 may be powered by a different power source, such as a motor or the like. The VDOP 180 may include additional components not depicted in FIG. 1, such as a hydraulic regulator.

In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 53, for example. An air filter 54 may be positioned upstream of compressor 50 and may filter fresh air entering intake passage 13. An intake air temperature (IAT) sensor 49 may be coupled to the intake passage 13 upstream of the air filter 54 to estimate ambient air temperature. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase vent tube 74. A first side 101 of crankcase vent tube 74 may be mechanically coupled, or connected, to fresh air intake passage 13 upstream of compressor 50. In some examples, the first side 101 of crankcase ventilation tube 74 may be coupled to intake passage 13 downstream of air cleaner 54 (as shown). In other examples, the crankcase ventilation tube may be coupled to intake passage 13 upstream of air cleaner 54. A second, opposite side 103 of crankcase ventilation tube 74 may be mechanically coupled, or connected, to crankcase 28 via an oil separator 81.

Crankcase vent tube 74 further includes a crankcase pressure sensor 77 coupled therein for providing an estimate about air flowing through crankcase vent tube 74 (e.g., pressure, flow rate, etc.). Pressure sensor 77 may be an absolute pressure sensor or a gauge sensor. In an alternate embodiment, sensor 77 may be a flow sensor or flow meter. In still another embodiment, sensor 77 may be configured as a venturi. One or more additional pressure and/or flow sensors may be coupled to the crankcase ventilation system at alternate locations. For example, a barometric pressure sensor (BP sensor) 47 may be coupled to intake passage 13, upstream of air filter 54, for providing an estimate of barometric pressure. Further still, a pressure sensor 59 may be coupled downstream of compressor 50 for providing an estimate of a throttle inlet pressure (TIP).

PCV system 16 also vents gases out of the crankcase and into intake manifold 42 via a conduit 76 (herein also referred to as PCV line 76). In some examples, PCV line 76 may include a one-way PCV valve 78 (that is, a passive valve that tends to seal when flow is in the opposite direction) to provide continual evacuation of crankcase gases from inside the crankcase 28 before connecting to the intake manifold 42.

The crankcase pressure sensor 77 may be opportunistically used for diagnostics of the VDOP 180. A high displacement mode of the VDOP may be a default mode during vehicle key-off conditions. A change in VDOP displacement may be commanded during unfueled cranking of the engine at the engine idling speed when engine temperature is substantially equal to ambient temperature, the cranking carried out via an electric machine during a vehicle key-off condition. Operation of the VDOP displacement may be transitioned from a high displacement mode with a solenoid de-energized to a low displacement mode with the solenoid energized. A first crankcase pressure may be estimated via the pressure sensor 77 during VDOP operation in the high displacement mode, and responsive to the first crankcase pressure being lower than a first baseline pressure, it may be indicated that the VDOP 180 is stuck in the low displacement mode. A second crankcase pressure may be estimated via the pressure sensor 77 during VDOP operation in the low displacement mode, and responsive to the second crankcase pressure being higher than a second baseline pressure, it may be indicated that the VDOP 180 is stuck in the high displacement mode. In one example, the first baseline pressure may be established via the crankcase pressure sensor 77 upon installation of the VDOP 180 by operating the VDOP 180 in the first displacement mode while cranking the engine unfueled at the idling speed and the second baseline pressure may be established via the crankcase pressure sensor 77 upon installation of the VDOP 180 by operating the VDOP 180 in the second displacement mode while cranking the engine unfueled at the idling speed. Details of the VDOP diagnostic routine is described with reference to FIG. 3.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58, engine coolant temperature (ECT) from temperature sensor 46, ambient temperature from intake air temperature sensor 49; PCV pressure from vacuum sensor 82, exhaust gas air/fuel ratio from exhaust gas sensor 64, oil pressure sensor 188, crankcase vent tube pressure sensor 77, BP sensor 57, TIP sensor 59, etc. Furthermore, controller 12 may monitor and adjust the position of various actuators based on input received from the various sensors. These actuators may include, for example, throttle 44, intake and exhaust valve systems 40, 41, solenoid 190, and PCV valve 78. Storage medium read-only memory 112 can be programmed with computer readable data representing instructions executable by processor 108 for performing the methods described below, as well as other variants that are anticipated but not specifically listed.

The controller 12 may adjust operation of the variable flow oil pump 180 in response to various operating conditions, such as engine speed. The controller 12 may operate the variable displacement oil pump 180 by energizing the solenoid 190. Controller 12 may energize solenoid 190 at high engine speeds, in one example. When energized, solenoid 190 may displace a spring actuator (not shown) which may cause internal rotors of the variable oil pump to pivot resulting in variable length vanes, thereby adjusting the pump to flow a low oil volume to the engine. Conversely, at low engine speeds, controller 12 may return the solenoid to its default position by de-energizing it, such that the oil pump may displace a high oil volume to the engine. In other examples, the controller 12 may adjust operation of the variable flow oil pump 180 in response to the engine being in boosted vs. naturally aspirated conditions (e.g., when compressed air is diverted to the engine, the variable flow oil pump 180 may be controlled to increase output). Controller 12 may also receive an indication of oil pressure from pressure sensor 188 positioned downstream of the output of the variable flow oil pump 180. The oil pressure indication may be used by the controller 12 to control adjustment of oil pressure by varying oil flow rate output from the oil pump. Upon indication of degradation of the oil pump 180, during an immediately subsequent engine operation, the controller 12 may adjust the engine idling speed such as increase the engine idling speed upon indication that the VDOP 180 is stuck in the low displacement mode.

In this way, the components of FIG. 1 enable a system for an engine, an electric machine coupled to a battery capable of rotating the engine, a crankcase including a variable displacement oil pump mechanically coupled to an engine, a solenoid configured to adjust a displacement of the oil pump, a crankcase vent tube mechanically connected to an intake passage upstream of a compressor, the tube also mechanically connected to the crankcase, a crankcase pressure sensor coupled to the crankcase vent tube, and a controller with computer readable instructions stored on non-transitory memory for: during unfueled cranking of the engine via the electric machine, commanding a change in displacement of the variable displacement oil pump via the solenoid, and sensing crankcase pressure via the crankcase pressure sensor before and after the commanded change in displacement, and indicating degradation of the oil pump based on the sensed crankcase pressure relative to a baseline pressure.

Figure 2:
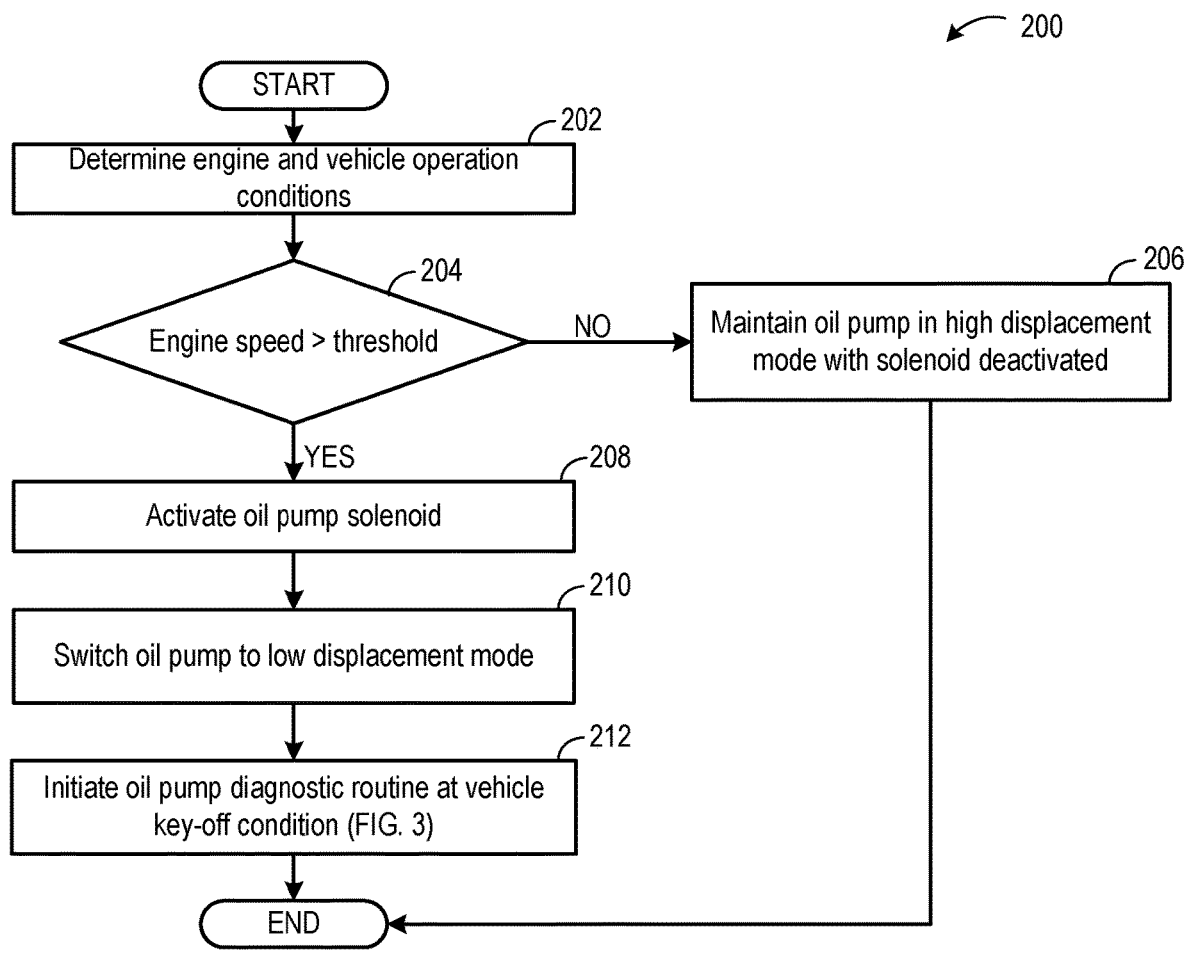
FIG. 2 shows a flow chart illustrating an example control routine for operating VDOP according to an embodiment of the present disclosure.

FIG. 2 shows an example method 200 that can be implemented for operating a variable displacement oil pump (such as VDOP 180 in FIG. 1) based on engine speed. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators (such as solenoid 190 in FIG. 1) of the engine system to adjust engine operation, according to the methods described below.

At 202, method 200 includes determining engine and vehicle operating conditions. Operating conditions may include engine speed, engine load, vehicle speed, pedal position, throttle position, mass air flow rate, air-fuel ratio, engine temperature, the amount of compressed air in the intake from the turbocharger, oil temperature, etc.

At 204, the method includes determining if the engine speed is greater than a threshold. In one example, a controller of the vehicle may determine the engine speed and may compare it to a non-zero speed threshold stored as a pre-determined threshold, to determine if the engine is operating at a speed greater than the threshold. In one example, the engine speed threshold may be 1800 RPM, such that the oil pump may be switched to the low displacement mode at engine speeds commonly exhibited during highway cruising. In other examples, the engine speed threshold may be 2500 RPM or higher, such that the oil pump may be switched to the low displacement mode only during high engine speed excursions, such as during operator tip-ins.

If it is determined that the engine speed is below the threshold speed, at 206, the oil pump may be maintained in the high displacement mode with the solenoid de-energized. As mentioned earlier, the VDOP may alternate between high displacement and low displacement modes of operation based on engine operating conditions, such as engine speed. For a given value of engine speed, a variable displacement oil pump in the high displacement mode may circulate a mass flow of lubrication oil which is greater than that circulated by the same VDOP in the low displacement mode. Variable oil displacement by the oil pump may be controlled by a spring actuator operably coupled to a solenoid, which may facilitate the changing of displacement modes by the oil pump to deliver variable amounts of oil. In one example, at low engine speeds, such as engine speeds below the speed threshold, the solenoid controlling the oil displacement from the VDOP may be at a default, de-energized position, and the VDOP may operate at a higher displacement setting, such that a suitable (larger) oil volume may be delivered to the engine for protection/lubrication of engine parts. The default mode of the oil pump may be the high displacement mode (and as such when the solenoid is de-energized, the pump may be in the high displacement mode), so as to avoid engine wear if the solenoid were to degrade. However, other configurations are possible, such as the solenoid being energized to adjust the oil pump to the high displacement mode.

If the engine is determined to be operating at a speed above the threshold, at 208, the oil pump solenoid may be energized. Solenoid energization may be directed by the controller, wherein the solenoid may be operably connected to a spring actuator responsible for varying vane length and thereby pump displacement. At 210, method 200 may switch the oil pump to a low displacement mode, via solenoid energization. When energized, the solenoid may adjust the oil pump to a lower displacement to displace a lower amount of oil relative to the high displacement mode, thereby minimizing pumping losses. Thus, fuel consumption by the engine may be reduced and fuel economy may be improved. In this way, transitioning from operating in the high displacement mode to operating in the low displacement mode includes energizing the solenoid.

At 212, during a subsequent vehicle key-off condition, the controller may opportunistically initiate diagnostics of the VDOP. Details of the VDOP diagnostic routine is discussed in relation to FIG. 3.

In this way, based on engine operating conditions such as engine speed, the variable displacement oil pump may be cycled between high and low oil displacement configurations as described in FIG. 2. Specifically, the VDOP may function in a high displacement mode at low engine speeds and be switched to a low displacement mode at high engine speeds, to fulfill engine lubrication and fuel economy demands without sustaining pumping losses.

Figure 3:
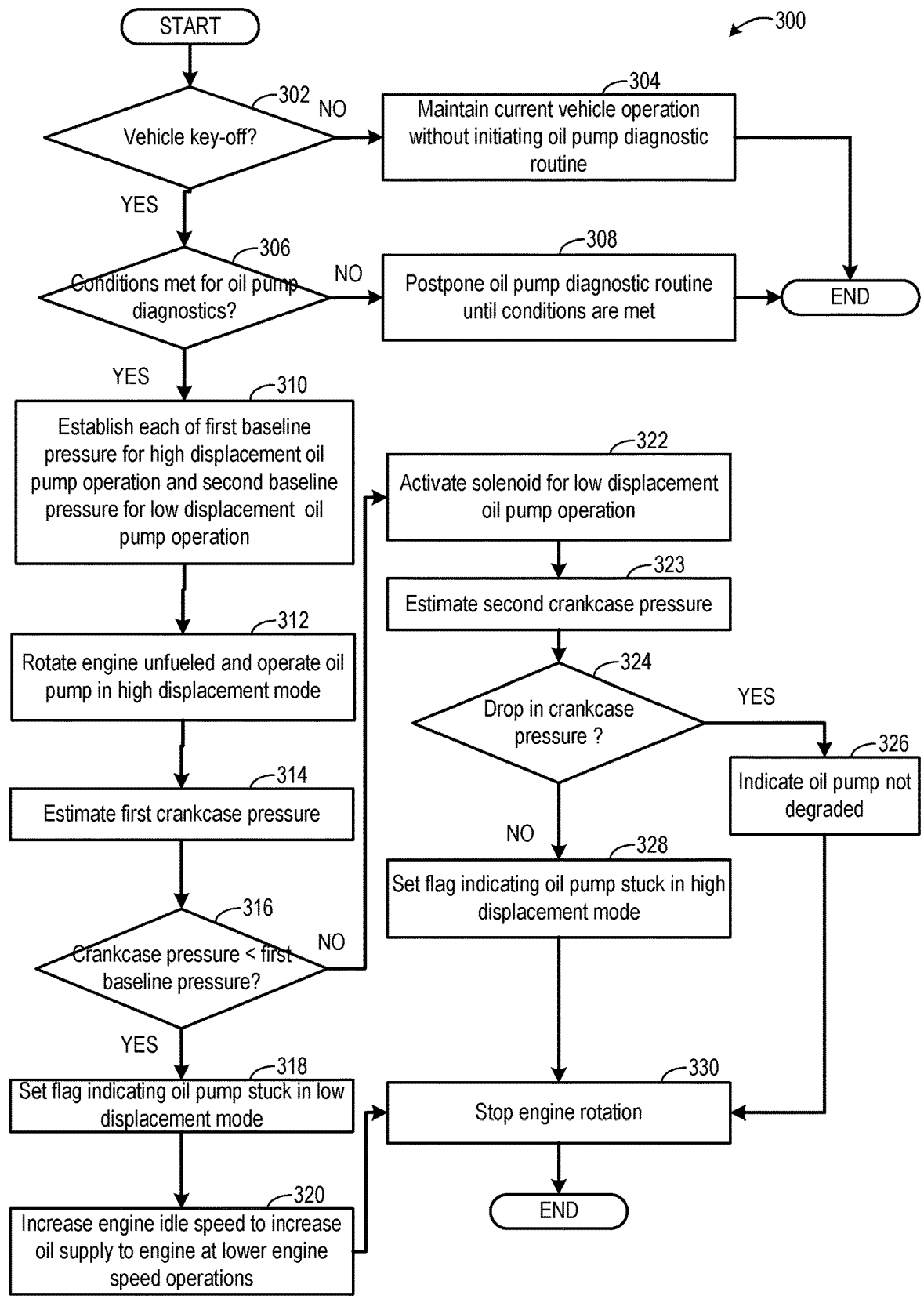
FIG. 3 shows a flow chart illustrating a diagnostic routine for diagnosing VDOP stuck in an oil displacement mode.

Turning now to FIG. 3, a flow chart illustrating an example diagnostic method 300 for diagnosing a variable oil pump stuck in an oil flow displacement mode is shown. Method 300 may be a part of method 200 and may be carried out at step 212.

At 302, the routine includes determining if the vehicle is in a key-off condition. A vehicle key-off condition includes a condition when the vehicle is not being propelled using engine torque and/or machine torque. During the vehicle key-off condition, the vehicle may be parked in a stationary position. If it is determined that the vehicle is not in the key-off condition, it may be inferred that the vehicle is being operated and at 304, current vehicle operation may be maintained without initiating VDOP diagnostics. The mode of operation of the VDOP may be continued to be adjusted based on engine speed.

If it is determined that the vehicle is in a key-off condition, at 306, the routine includes determining if entry conditions are met for initiating diagnostics of the VDOP. In one example, entry conditions for initiating VDOP diagnostics include the engine temperature as estimated via an engine coolant temperature sensor being substantially equal to the ambient temperature as estimated via an intake air temperature sensor. As an example, substantially equal includes the engine temperature being within a threshold margin of the ambient temperature. In one example, the threshold margin may be 5%. During engine operation, the crankcase pressure may be influenced due to peripheral heating such as due to engine combustion, crankcase rotation, transmission heat rejection, driveshaft heat, friction brake heat, fuel system pump operation, tarmac heating, etc. In another example, VDOP diagnostics may be carried out responsive to a wakeup of the controller after a predetermined duration after a key-off event, or in a case where the vehicle comprises an autonomous vehicle that is unoccupied. Further, prior to initiating the VDOP diagnostics, the controller may verify if a predetermined duration of time has elapsed since a prior VDOP diagnostic routine. In some examples, such a predetermined duration of time may comprise 1 day, greater than 1 day but less than 2 days, greater than 2 days, etc.

During certain conditions, the VDOP diagnostics may be carried out even when the vehicle is operational. In one example, during the VDOP diagnostics, fuel economy may be impacted, therefore the controller may opportunistically carry out the diagnostics during a deceleration fuel shut off (DFSO) condition such as when the vehicle is coasting downhill and is not consuming fuel. In another example, if the vehicle is being propelled using motor torque, the electric motor may be used to spin the engine unfueled to conduct the VDOP diagnostics. The battery power used for carrying out the diagnostics may me regained later in the drive cycle by regenerative braking recharge of the electric motor battery.

If it is determined that the entry conditions are not met for carrying out diagnostics of the VDOP, at 308, the VDOP diagnostic routine may be postponed until the entry conditions for the diagnostic are met. If it is determined that the entry conditions are met for carrying out diagnostics of the VDOP, it may be inferred that since the engine temperature has reduced to the ambient temperature, the estimated crankcase pressure may be directly proportional to the pumping action of the VDOP.

At 310, a first baseline pressure may be established for high displacement VDOP operation and a second baseline pressure may be established for low displacement VDOP operation. In one example, establishing each of the first baseline pressure and the second baseline pressure includes the controller retrieving the first baseline pressure and the second baseline pressure from an on-board database. In one example, the first baseline pressure and the second baseline pressure may be estimated via the crankcase pressure sensor (such as pressure sensor 77 in FIG. 1) upon installation of the VDOP by cranking the engine unfueled. The first baseline pressure may be estimated while operating the VDOP in high displacement mode with the solenoid (such as solenoid 190 in FIG. 1) de-energized. The second baseline pressure may be estimated while operating the VDOP in low displacement mode with the solenoid energized. In one example, installation of the VDOP may include fitting VDOP to the engine at a manufacturing facility. In another example, installation of the VDOP may include replacement of an older VDOP with a new VDOP at a service location.

There may be a co-relation between the first baseline pressure and the second baseline pressure. As an example, the second baseline pressure may be a function of the first baseline pressure. The first baseline pressure may be estimated (as described above) and then the second baseline pressure may be computed as a function of the first baseline pressure. In one example, the second baseline pressure may be 30% of the first baseline pressure.

The first baseline pressure and the second baseline pressure may be estimated within a first threshold duration since installation of the VDOP while the diagnostics of the VDOP may be carried out when the VDOP has been in use for over a second threshold duration, the second threshold duration being longer than the first threshold duration. In one example, the first threshold duration may be one day since the installation of the VDOP. In another example, the second threshold duration may be 30 days since the installation of the VDOP. Alternatively, the first baseline pressure and the second baseline pressure may be estimated within a first threshold distance of travel (of the vehicle) since installation of the VDOP while the diagnostics of the VDOP may be carried out when the VDOP has been in use for over a second threshold distance of travel, the second threshold distance longer than the first threshold distance. In one example, the first threshold distance may be 30 miles since the installation of the VDOP. In another example, the second threshold distance may be 300 miles since the installation of the VDOP. The first baseline pressure and the second baseline pressure may be obtained while operating the engine at an idling speed. In one example, the idling speed is 500 RPM.

At 312, the engine is rotated unfueled using motor torque from an electric machine (such as electric machine 52 in FIG. 1). The controller may send a signal to the actuator of the electric motor to start spinning the engine at an idling speed, such as at or around 500 RPM. The controller may send a signal to the spring actuator operably coupled to the solenoid of the VDOP to operate the VDOP in the high displacement mode. In the high displacement mode, the solenoid is maintained in the default de-energized position. As the pump is operated in the high displacement mode, pumping work done by the VDOP may be higher, and a higher volume of oil (lubricant) is supplied to the engine oil gallery (such as engine oil gallery 192 in FIG. 1). Due to the higher volume of oil being displaced by the operation of the VDOP, a higher volume of oil may vaporize thereby increasing crankcase pressure.

At 314, a first crankcase pressure during VDOP operation in the high displacement mode may be estimated via the crankcase pressure sensor. At 316, the routine includes determining if the crankcase pressure is lower than the first baseline pressure. In one example, the controller may determine if the crankcase pressure is more than a threshold (e.g., more than 10%) lower than the first baseline pressure. As previously elaborated, the first baseline pressure corresponds to the crankcase pressure estimated by the crankcase pressure sensor during VDOP operation in the high displacement mode upon installation of the VDOP.

If it is determined that the first crankcase pressure is lower than the first baseline pressure, it may be inferred that even when the VDOP is commanded to be operated in the high displacement mode, the VDOP is stuck in the low displacement mode and is unable to displace sufficient oil as was displaced by the VDOP upon installation (during operation in the high displacement mode). Therefore, at 318, a diagnostics code (flag) is set indicating that the VDOP is stuck in the low displacement mode. For example, an operator may be notified by illuminating an indicator on the vehicle instrument panel alerting the vehicle operator of the received notification.

Since the VDOP is stuck in the low displacement mode, during subsequent engine operations at lower engine speeds, there may not be enough oil supply to the engine components, increasing the possibility of engine wear. Therefore at

320, the controller may increase the engine idling speed in order to increase oil supply to engine components at lower engine speed operations. The engine idle speed may comprise a speed at which the engine is operated at during idle engine conditions. For example, during engine idle conditions (e.g., where the engine is operating but the vehicle is not being propelled by the engine due to the engine being uncoupled from the vehicle drivetrain), an idle engine throttle may be controlled to a given position to maintain engine speed at a commanded idle speed. When the oil pump is not degraded, the commanded idle speed may be 500 RPM in one non-limiting example. If the oil pump is determined to be stuck in the low displacement mode, the commanded idle speed may be increased to 1000 RPM, in a non-limiting example. The increased commanded idle speed may result in the idle engine throttle being controlled to a more open position and/or the increased commanded idle speed may result in the intake throttle being controlled to a more open position during idle.

If at 316 it is determined that the crankcase pressure is not lower than the first displacement mode, it may be inferred that the VDOP is operating in the commanded high displacement mode and that the crankcase pressure is substantially equal (such as with a 5% threshold) to the first baseline pressure. At 322, the controller may send a signal to the spring actuator operably coupled to the solenoid of the VDOP to operate the VDOP in the low displacement mode with the solenoid energized. As the pump is operated in the low displacement mode with the engine speed remaining constant, a lower volume of oil is supplied to the engine oil gallery. Due to the lower volume of oil being displaced by the operation of the VDOP, a lower volume of oil may vaporize thereby decreasing crankcase pressure.

At 323, a second crankcase pressure during VDOP operation in the low displacement mode may be estimated via the crankcase pressure sensor. At 324, the routine includes determining is a drop in crankcase pressure is observed. In one example, the routine may determine if the difference between the second crankcase pressure and the first crankcase pressure is higher than a non-zero threshold pressure difference. As an example, the threshold pressure difference may be calibrated based on crankcase pressure estimated during VDOP operation in each of the high displacement mode and the low displacement mode upon installation of the VDOP.

In another example, the routine may also determine if upon transitioning from the high displacement mode to the low displacement mode, the second crankcase pressure has reduced to the second baseline pressure (such as within 10% of the second baseline pressure). As previously elaborated, the second baseline pressure corresponds to the crankcase pressure estimated by the crankcase pressure sensor during VDOP operation in the low displacement mode upon installation of the VDOP. In this way, each of the first crankcase pressure, the second crankcase pressure, the first baseline pressure, and the second baseline pressure may be estimated via a crankcase pressure sensor while an engine is rotated unfueled via an electric motor during a vehicle keyed-off condition.

If it is determined that upon energizing the solenoid and operating the VDOP in the low displacement mode, the difference between the second crankcase pressure and the first crankcase pressure is higher than the threshold pressure difference and/or the crankcase pressure has dropped to the second baseline pressure, at 326, the controller may indicate that the pump is not degraded. However, if it is determined the difference between the second crankcase pressure and the first crankcase pressure is lower than the threshold pressure difference or the second crankcase pressure is higher than the second baseline pressure, it may be inferred that even when the VDOP is commanded to be operated in the low displacement mode, the VDOP is stuck in the high displacement mode. Therefore, at 328, a diagnostics code (flag) is set indicating that the VDOP is stuck in the high displacement mode. For example, an operator may be notified by illuminating an indicator on the vehicle instrument panel alerting the vehicle operator of the received notification. Due to the VDOP being stuck in the high displacement mode, during engine operation at higher than threshold speed (as discussed in step 204 in FIG. 2) a higher amount of oil may be pumped, thereby increasing pumping losses. Also, fuel economy may be adversely affected due to VDOP operation in the high displacement mode at each engine speed.

At 330, the diagnostic routine is completed and the engine may no longer be rotated. The controller may send a signal to the motor powering the engine to stop rotating the engine and the engine may be returned to a shutdown condition.

In this way, during a key-off condition, for a variable displacement oil pump which may be transitioned from operating in the high displacement mode to operating in the low displacement mode via a solenoid, a first crankcase pressure may be estimated while operating the pump in a high displacement mode, the pump may be indicated to be stuck in a low displacement mode based on the first crankcase pressure being lower than a first baseline pressure, and during a subsequent key-on condition, an engine idle speed may be increased responsive to the oil pump being stuck in the low displacement mode.

FIG. 4 shows an example timeline 400 illustrating diagnostics of a variable displacement oil pump (VDOP). The horizontal (x-axis) denotes time and the vertical markers t1-t5 identify significant times in the VDOP diagnostic routine.

The first plot, line 402, shows variation in vehicle speed over time. The second plot, line 404, shows engine temperature as estimated via an engine coolant temperature sensor. Dashed line 406 shows ambient temperature as estimated via an intake air temperature sensor. The third plot, line 408, shows operation of a solenoid control valve coupled to the VDOP. The solenoid may be energized to transition operation of the VDOP from a high displacement mode to a low displacement mode. The fourth plot, line 410, shows variation in engine speed over time. Dotted line 409 shows a threshold engine speed above which the VDOP may be operated in the low displacement mode. The threshold speed 409 may be a non-zero speed threshold calibrated based on engine oil displacement corresponding to engine operation at each engine speed. The fifth plot, line 412, shows a crankcase pressure as estimated via a crankcase pressure sensor (such as crankcase pressure sensor 77 in FIG. 1) coupled to a crankcase vent tube. Dashed line 413 shows a first baseline pressure as estimated via the crankcase pressure sensor upon installation of the VDOP by cranking the engine unfueled with the VDOP operating in high displacement mode. Dashed line 415 shows a second baseline pressure as estimated via the crankcase pressure sensor upon installation of the VDOP by cranking the engine unfueled with the VDOP operating in low displacement mode. The sixth plot, line 418, shows a mode of operation of the VDOP. The seventh plot, line 419, shows operation of the electric machine coupled to the hybrid electric vehicle (HEV). The machine may be operated to provide motor torque to propel the HEV. The seventh plot, line 420, shows a position of a flag indicating degradation of the VDOP.

Prior to time t1, the vehicle is propelled using engine torque and the HEV motor is not operated. Based on the higher than threshold 409 engine speed, the VDOP is operated in the high displacement mode with the solenoid de-energized. During this time, the crankcase pressure is a function of engine operating conditions such as engine temperature and VDOP operation in the high displacement mode. Since the diagnostics of the VDOP is not yet carried out, the flag is maintained in the off state.

At time t1, the engine is shut down and the vehicle is stopped. As the engine is not operated, lubrication of engine parts is not desired, and therefore operation of the VDOP is stopped at time t1. Between time t1 and t2, the vehicle is not propelled using engine torque and/or machine torque. As combustion is suspended, engine heat is no longer produced and the engine temperature may steadily decrease as the existing engine heat is dissipated to the atmosphere.

At time t2, as the engine temperature reduces to the ambient temperature, it may be inferred that crankcase pressure is no longer influenced by an elevated engine temperature (relative to ambient temperature). Therefore, at time t2, diagnostics of the VDOP is initiated. The controller sends a signal to the electric machine to rotate the engine unfueled at the engine idling speed. Between time t2 and t3, the solenoid coupled to the VDOP is maintained in the de-energized state and the VDOP is operated in the high displacement mode. Due to the operation of the VDOP in the high displacement mode, the fuel vapor formed in the crankcase causes the crankcase pressure to increase. The crankcase pressure increases to the first baseline pressure 413 (as estimated during VDOP operation in high displacement mode upon installation of the VDOP) indicating that the VDOP is not degraded and is operating in the commanded high displacement mode. Since, it is inferred that the VDOP is not stuck in the low displacement mode, the flag is maintained in the off state.

However, if between t2 and t3, it was observed that even if the VDOP is commanded to be operated in the high displacement mode, the crankcase pressure (as shown by dotted line 417) remained substantially equal to the second baseline pressure 415, it would have been inferred that the VDOP is degraded and is stuck in the low displacement mode. A flag 420 would have been set after time t2 indicating that the VDOP is stuck in the low displacement mode.

At time t3, the solenoid is actuated to an energized position and the VDOP operation is transitioned from the high displacement mode to a low displacement mode. Due to the operation of the VDOP in the low displacement mode, between time t3 and t4, the work done by the VDOP is lower relative to the pump operation in the high displacement mode, thereby producing a lower amount of fuel vapor. The crankcase pressure decreased to the second baseline pressure 415 (as estimated during VDOP operation in low displacement mode upon installation of the VDOP) indicating that the VDOP is not degraded and is capable of transitioning from the high displacement mode to the low displacement mode. Since, it is inferred that the VDOP is not stuck in the high displacement mode, the flag is maintained in the off state.

However, if between t3 and t4 it was observed that even if the VDOP is commanded to be operated in the low displacement mode, the crankcase pressure (as shown by dotted line 416) did not decrease from the crankcase pressure corresponding to the high displacement VDOP operation, it would have been inferred that the VDOP is degraded and is stuck in the high displacement mode. A flag 422 would have been set after time t3 indicating that the solenoid could not be energized and the VDOP is stuck in the high displacement mode.

At time t4, upon completion of the VDOP diagnostics, the controller sends a signal to the HEV electric motor to suspend operation of the motor and to stop spinning the engine. Between time t4 and t5, the vehicle is not propelled and the engine is maintained in the non-combusting condition.

At time t5, the vehicle is started from rest and propelled using engine torque. The engine is cranked until the engine speed increases to the idling speed. Due to the lower than threshold engine speed, the solenoid may be maintained in the de-energized state and the VDOP may be operated in the high displacement mode to supply the desired amount of lubricant to the engine components. As it is determined during the VDOP diagnostic that the VDOP is not degraded, upon engine restart, the engine idling speed is maintained (at the level prior to the diagnostic process). However, if it was determined that the VDOP is stuck in low displacement mode even during engine operation at the lower than threshold engine speed, as shown by dashed line 411, the idling speed would have been increased to the threshold engine speed. At the increased idling speed, even if the VDOP is stuck in the low displacement mode, due to the crankshaft rotation at a higher speed, an increased amount of lubricant would have been displaced, thereby reducing any possibility of engine wear caused due to increased friction (from lack of lubrication).

In this way, by carrying out diagnostics of the VDOP during vehicle key-off conditions, it is possible to operate the VDOP in both displacement modes without having to wait for a change in engine speed for identifying the displacement mode at which the VDOP is stuck. By identifying the displacement mode at which the VDOP is stuck, suitable changes to engine idling speed may be carried out during a subsequent engine operation, and engine wear due to inadequate lubrication may be reduced. The technical effect of using existing engine components, such as a crankcase pressure sensor, for VDOP diagnostics is that the need for additional sensors and/or equipment for diagnostics of a VDOP may be reduced. By monitoring VDOP displacement changes occur responsive to commanded operation of the solenoid, optimal usage of lubricant without wastage may be ensured. Overall, by regularly monitoring the health of the VDOP, engine operation and fuel efficiency may be improved.

An example method comprises: indicating degradation of a variable displacement oil pump (VDOP) based on a change in an estimated crankcase pressure, upon a commanded change in VDOP displacement. In any preceding example, the method further comprises, additionally or optionally, during an immediately subsequent engine operation, adjusting an engine idling speed responsive to the indication of degradation of the VDOP. In any or all of the preceding examples, the method further comprises, additionally or optionally, commanding the change in VDOP displacement during a vehicle key-off condition when engine temperature is substantially equal to ambient temperature. In any or all of the preceding examples, additionally or optionally, commanding the change VDOP displacement includes commanding the change while cranking the engine, unfueled, during the vehicle key-off condition via an electric machine. In any or all of the preceding examples, additionally or optionally, the commanded change in VDOP displacement is from a high displacement mode with a solenoid de-energized to a low displacement mode with the solenoid energized, the high displacement mode being a default mode during the vehicle key-off condition. In any or all of the preceding examples, additionally or optionally, the indicating degradation of the VDOP includes, estimating a first crankcase pressure during VDOP operation in the high displacement mode, and indicating that the VDOP is stuck in the low displacement mode responsive to the first crankcase pressure being lower than a first baseline pressure. In any or all of the preceding examples, additionally or optionally, indicating degradation of the VDOP includes, estimating a second crankcase pressure during VDOP operation in the low displacement mode, and indicating that the VDOP is stuck in the high displacement mode responsive to the second crankcase pressure being lower than a second baseline pressure, the second baseline pressure lower than the first baseline pressure. In any or all of the preceding examples, additionally or optionally, indicating degradation of the VDOP further includes, indicating that the VDOP is stuck in the high displacement mode responsive to a difference between the first crankcase pressure and the second crankcase pressure being lower than a threshold difference. In any or all of the preceding examples, additionally or optionally, each of the first crankcase pressure and the second crankcase pressure are estimated via a crankcase pressure sensor housed in a crankcase ventilation tube coupling a crankcase to an engine intake manifold. In any or all of the preceding examples, the method further comprises, additionally or optionally, establishing the first baseline pressure via the crankcase pressure sensor upon installation of the VDOP by operating the VDOP in the high displacement mode while cranking the engine unfueled at the idling speed; and establishing the second baseline pressure via the crankcase pressure sensor upon installation of the VDOP by operating the VDOP in the low displacement while cranking the engine unfueled at the idling speed. In any or all of the preceding examples, additionally or optionally, adjusting the engine idling speed includes increasing the engine idling speed responsive to the VDOP being stuck in the low displacement mode.

Another method for an engine comprises: during a key-off condition, estimating a first crankcase pressure while operating an oil pump in a high displacement mode, indicating that the oil pump is stuck in a low displacement mode based on the first crankcase pressure being lower than a first baseline pressure, and during a subsequent key-on condition, increasing an engine idle speed responsive to the indicating. In any preceding example, additionally or optionally, the oil pump is a variable displacement oil pump and wherein operating in the high displacement mode includes de-energizing a solenoid. In any or all of the preceding examples, the method further comprises, additionally or optionally, transitioning the pump from the high displacement mode a low displacement mode by energizing the solenoid. In any or all of the preceding examples, the method further comprises, additionally or optionally, after the transitioning, estimating a second crankcase pressure, and indicating that the oil pump is stuck in the high displacement mode responsive to the second crankcase pressure being higher than a second baseline pressure, the second baseline pressure lower than the first baseline pressure. In any or all of the preceding examples, additionally or optionally, each of the first crankcase pressure, the second crankcase pressure, the first baseline pressure, and the second baseline pressure are estimated via a crankcase pressure sensor while the engine is rotated unfueled via an electric motor during the vehicle keyed-off condition. In any or all of the preceding examples, the method further comprises, additionally or optionally, establishing each of the first baseline pressure and the second baseline pressure within a threshold duration of installation of the oil pump.

In yet another example, a hybrid vehicle system comprises: an engine, an electric machine coupled to a battery capable of rotating the engine, a crankcase including a variable displacement oil pump mechanically coupled to an engine, a solenoid configured to adjust a displacement of the oil pump, a crankcase vent tube mechanically connected to an intake passage upstream of a compressor, the tube also mechanically connected to the crankcase, a crankcase pressure sensor coupled to the crankcase vent tube, and a controller with computer readable instructions stored on non-transitory memory for: during unfueled cranking of the engine via the electric machine, commanding a change in displacement of the variable displacement oil pump via the solenoid, sensing crankcase pressure via the crankcase pressure sensor before and after the commanded change in displacement, and indicating degradation of the oil pump based on the sensed crankcase pressure relative to a baseline pressure. In any preceding example, additionally or optionally, the baseline pressure includes a first baseline pressure and a second baseline pressure, the controller including instructions for: establishing the first baseline pressure by rotating the engine via the electric machine when the oil pump is first installed and operated in a high displacement mode, and establishing the second baseline pressure by rotating the engine via the electric machine when the oil pump is first installed and operated in a low displacement mode. In any or all of the preceding examples, additionally or optionally, the commanded change in displacement is from the high displacement mode to the low displacement mode, and wherein indicating degradation of the oil pump includes: indicating that the pump is stuck in the low displacement mode with the solenoid de-energized responsive to the sensed crankcase pressure before the commanded change in displacement being lower than the first baseline pressure, and indicating that the pump is stuck in the high displacement mode with the solenoid energized responsive to the sensed crankcase pressure after the commanded change in displacement being higher than the second baseline pressure. In any or all of the preceding examples, additionally or optionally the controller includes instructions for: responsive to indicating that the pump is stuck in the low displacement mode, increasing an engine idling speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
indicating degradation of a variable displacement oil pump (VDOP) based on a change in an estimated crankcase pressure, upon a commanded change in VDOP displacement,
wherein the commanded change in VDOP displacement is from a high displacement mode with a solenoid de-energized to a low displacement mode with the solenoid energized, the high displacement mode being a default mode during a vehicle off condition, and wherein the indicating degradation of the VDOP includes estimating a first crankcase pressure during VDOP operation in the high displacement mode, and indicating that the VDOP is stuck in the low displacement mode responsive to the first crankcase pressure being lower than a first baseline pressure, and
wherein the commanded change in VDOP displacement includes commanding the change while cranking an engine, unfueled, via an electric machine.

2. The method of claim 1, further comprising, upon the indicating the degradation of the VDOP, during subsequent vehicle on condition, adjusting an engine idling speed responsive to the indication of degradation of the VDOP.

3. The method of claim 2, wherein the commanding the change in VDOP displacement is during the vehicle off condition when engine temperature is substantially equal to ambient temperature.

4. The method of claim 2, wherein indicating degradation of the VDOP includes estimating a second crankcase pressure during VDOP operation in the low displacement mode, and indicating that the VDOP is stuck in the high displacement mode responsive to the second crankcase pressure being lower than a second baseline pressure, the second baseline pressure lower than the first baseline pressure.

5. The method of claim 4, wherein indicating degradation of the VDOP further includes indicating that the VDOP is stuck in the high displacement mode responsive to a difference between the first crankcase pressure and the second crankcase pressure being lower than a threshold difference.

6. The method of claim 4, wherein each of the first crankcase pressure and the second crankcase pressure are estimated via a crankcase pressure sensor housed in a crankcase ventilation tube coupling a crankcase to an engine intake manifold.

7. The method of claim 6, further comprising establishing the first baseline pressure via the crankcase pressure sensor upon installation of the VDOP by operating the VDOP in the high displacement mode while cranking the engine unfueled at the idling speed; and establishing the second baseline pressure via the crankcase pressure sensor upon installation of the VDOP by operating the VDOP in the low displacement mode while cranking the engine unfueled at the idling speed.

8. The method of claim 2, wherein adjusting the engine idling speed includes increasing the engine idling speed responsive to the VDOP being stuck in the low displacement mode.

9. A method for an engine, comprising:
during a vehicle off condition,
rotating the engine via an electric motor;
estimating a first crankcase pressure while operating an oil pump in a high displacement mode; and
indicating that the oil pump is stuck in a low displacement mode based on the first crankcase pressure being lower than a first baseline pressure; and
during a subsequent vehicle on condition, increasing an engine idle speed responsive to the indicating, wherein the first baseline pressure is established within a threshold duration of installation of the oil pump.

10. The method of claim 9, wherein the oil pump is a variable displacement oil pump and wherein operating in the high displacement mode includes de-energizing a solenoid.

11. The method of claim 10, further comprising transitioning the pump from the high displacement mode to the low displacement mode by energizing the solenoid.

12. The method of claim 11, further comprising, after the transitioning, estimating a second crankcase pressure and indicating that the oil pump is stuck in the high displacement mode responsive to the second crankcase pressure being higher than a second baseline pressure, the second baseline pressure lower than the first baseline pressure.

13. The method of claim 12, wherein each of the first crankcase pressure, the second crankcase pressure, the first baseline pressure, and the second baseline pressure are estimated via a crankcase pressure sensor while the engine is rotated unfueled via the electric motor during the vehicle off condition.

14. The method of claim 12, further comprising establishing the second baseline pressure within the threshold duration of the installation of the oil pump.

15. A hybrid vehicle system, comprising:
an engine;
an electric machine coupled to a battery capable of rotating the engine;
a crankcase including a variable displacement oil pump mechanically coupled to the engine;
a solenoid configured to adjust a displacement of the oil pump;
a crankcase vent tube mechanically connected to an intake passage upstream of a compressor, the tube also mechanically connected to the crankcase;
a crankcase pressure sensor coupled to the crankcase vent tube; and a controller with computer readable instructions stored on non-transitory memory for:

during an engine-off condition,
cranking the engine, unfueled, via the electric machine,
commanding a change in displacement of the variable displacement oil pump via the solenoid;
sensing crankcase pressure via the crankcase pressure sensor before and after the commanded change in displacement;
indicating degradation of the oil pump based on the sensed crankcase pressure relative to a baseline pressure, the baseline pressure including a first baseline pressure and a second baseline pressure; and
establishing the first baseline pressure by rotating the engine via the electric machine when the oil pump is first installed and operated in a high displacement mode, and establishing the second baseline pressure by rotating the engine via the electric machine when the oil pump is first installed and operated in a low displacement mode.

16. The system of claim 15, wherein the commanded change in displacement is from the high displacement mode to the low displacement mode, and wherein indicating degradation of the oil pump includes:
indicating that the oil pump is stuck in the low displacement mode with the solenoid de-energized responsive to the sensed crankcase pressure before the commanded change in displacement being lower than the first baseline pressure; and
indicating that the oil pump is stuck in the high displacement mode with the solenoid energized responsive to the sensed crankcase pressure after the commanded change in displacement being higher than the second baseline pressure.

17. The method of claim 1, further comprising, during engine operation, varying oil flow rate output from the VDOP based on a sensed oil pressure from an oil pressure sensor coupled to the VDOP.

* * * * *